(12) United States Patent
Onaizi (10) Patent No.: US 11,746,278 B1
(45) Date of Patent: Sep. 5, 2023

(54) METHOD OF REMOVING SULFIDE-CONTAINING SCALE

(71) Applicant: KING FAHD UNIVERSITY OF PETROLEUM AND MINERALS, Dhahran (SA)

(72) Inventor: Sagheer A. Onaizi, Dhahran (SA)

(73) Assignee: KING FAHD UNIVERSITY OF PETROLEUM AND, MINERALS Dhahran (SA)

( * ) Notice: Subject to any disclaimer, the term of this patent is extended or adjusted under 35 U.S.C. 154(b) by 0 days.

(21) Appl. No.: 17/830,932

(22) Filed: Jun. 2, 2022

(51) Int. Cl.
*E21B 43/28* (2006.01)
*C09K 8/532* (2006.01)

(52) U.S. Cl.
CPC .......... *C09K 8/532* (2013.01); *C09K 2208/20* (2013.01)

(58) Field of Classification Search
None
See application file for complete search history.

(56) References Cited

U.S. PATENT DOCUMENTS

| | | | |
|---|---|---|---|
| 4,089,809 A | 5/1978 | Farrior, Jr. | |
| 4,489,047 A | 12/1984 | De Jong et al. | |
| 5,227,351 A | 7/1993 | Gasper-Galvin et al. | |
| 8,822,386 B2 | 9/2014 | Quintero et al. | |
| 9,713,786 B2 | 7/2017 | Braga | |
| 10,501,676 B2 | 12/2019 | Elkatatny et al. | |
| 2013/0272943 A1* | 10/2013 | Braga | B32B 15/10 428/537.1 |
| 2020/0087568 A1* | 3/2020 | Mahmoud | C09K 8/532 |
| 2021/0355809 A1* | 11/2021 | Oduro | C09K 8/32 |

FOREIGN PATENT DOCUMENTS

| | | | | |
|---|---|---|---|---|
| CN | 104046346 A | * | 9/2014 | ............. C09K 8/524 |
| GB | 2417044 A | * | 2/2006 | ............. C09K 8/508 |
| JP | 2020530069 A | * | 10/2020 | |

OTHER PUBLICATIONS

Ali Ghayedi, et al., "Laboratory investigation of the effect of GO—ZnO nanocomposite on drilling fluid properties and its potential on $H_2S$ removal in oil reservoirs", Journal of Petroleum Science and Engineering, vol. 184, Jan. 2020, 3 pages (Abstract only).

(Continued)

*Primary Examiner* — Charles R Nold
(74) *Attorney, Agent, or Firm* — Oblon, McClelland, Maier & Neustadt, L.L.P.

(57) ABSTRACT

A method of removing a sulfide-containing scale from a wellbore, pipe, or other metal-containing surface associated with an oil or gas well is provided. The method includes contacting the sulfide-containing scale with a de-scaler solution including an aqueous solvent, an acid and a hydrogen sulfide scavenger. The hydrogen sulfide scavenger includes particles of a manganese oxide supported on a porous support. The particles are suspended in the aqueous solvent. The method includes reacting the acid with the sulfide-containing scale to produce hydrogen sulfide. The method further includes reacting the hydrogen sulfide in the wellbore with the manganese oxide to form a manganese sulfide.

6 Claims, 2 Drawing Sheets

(56) References Cited

OTHER PUBLICATIONS

Svatopluk Chytil, et al., "Preparation and Characterization of $Mn_xO_y$—$Al_2O_3$ Sorbents for $H_2S$ Removal from Biomass Gasification Gas", Energy Procedia, $2^{nd}$ Trondheim Gas Technology Conference, vol. 26, 2012, pp. 98-106.

Haifeng Li, et al., "Effect of La-Modified Supporter on $H_2S$ Removal Performance of $Mn/La/Al_2O_3$ Sorbent in a Reducing Atmosphere", Industrial & Engineering Chemistry Research, vol. 58, No. 19, Apr. 17, 2019, pp. 8260-8270 (Abstract only).

* cited by examiner

METHOD OF REMOVING SULFIDE-CONTAINING SCALE

CROSS-REFERENCE TO RELATED APPLICATION

The present application is related to the application titled "Hydrogen Sulfide Mitigating Drilling Fluid and Method of Drilling Subterranean Geological Formation" (U.S. patent application Ser. No. 17/857,411).

BACKGROUND

Technical Field

The present disclosure is directed to a method of removing a scale from a wellbore, pipe, or other metal-containing surface associated with an oil or gas well, and particularly, to the method of removing a sulfide-containing scale from the wellbore, pipe, or other metal-containing surface associated with the oil or gas well.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Crude oil and gas reservoirs may contain hydrogen sulfide gas which may be generated by indigenous microorganisms such as sulfate reducing bacteria. Hydrogen sulfide gas is highly corrosive which may damage well integrity. Further, a metal sulfide scale is formed as a result of a reaction of the hydrogen sulfide gas with a metallic surface of an oil/gas well. Formation of metal sulfide scales such as iron sulfide scales may cause one or more operational problems such as interference with downhole tools (for example, an artificial lift equipment), loss in an injectivity in water injection wells and reduction in well productivity which may be attributed to blockage of a wellbore. Formation of metal sulfide scales in pipelines and processing facilities also causes operational issues.

Conventionally, metal sulfide scale (in particular, the iron sulfide scale) is removed by using a concentrated acid solution. However, dissolution of the metal sulfide scale using concentrated acids may release a significant amount of hydrogen sulfide gas. Exposure of working personnel at surface facilities to the hydrogen sulfide gas is harmful. The hydrogen sulfide is poisonous to humans and animals, and may be lethal at levels as low as 350 parts per million (ppm) within a short exposure time.

Conventionally, sulfide-containing scale removal compositions that contain acidic aqueous solutions are aldehyde-based and may be carcinogenic. Further, conventional sulfide-containing scale removal compositions are devoid of components that function to efficiently reduce or eliminate metal sulfide scales and scavenge hydrogen sulfide gas at the same time. Hence, there is a need for methods which may reduce or eliminate the aforementioned limitations.

SUMMARY

In an exemplary embodiment, a method of removing a sulfide-containing scale from a wellbore, pipe, or other metal-containing surface associated with an oil or gas well is described. The method includes contacting the sulfide-containing scale with a de-scaler solution including an aqueous solvent, an acid and a hydrogen sulfide scavenger. The hydrogen sulfide scavenger includes particles of a manganese oxide supported on a porous support. The particles are suspended in the aqueous solvent. The method includes reacting the acid with the sulfide-containing scale to produce hydrogen sulfide. The method further includes reacting the hydrogen sulfide in the wellbore with the manganese oxide to form a manganese sulfide.

In some embodiments, the porous support is at least one selected from the group consisting of an aluminum oxide, a zirconium oxide, a silicate material, a carbon nanomaterial, a metal organic framework (MOF), and a zeolitic imidazolate framework (ZIF).

In some embodiments, the porous support is aluminum oxide.

In some embodiments, the aluminum oxide is gamma (γ) aluminum oxide.

In some embodiments, the hydrogen sulfide scavenger has a molar ratio of manganese to aluminum of 1:1 to 1:5.

In some embodiments, the hydrogen sulfide scavenger is present as particles having a mean particle size of 100 to 10,000 nanometers (nm).

In some embodiments, the particles of the manganese oxide have a mean particle size of 5 to 150 nm and are on at least one selected from an exterior surface of the porous support and within pores of the porous support.

In some embodiments, the hydrogen sulfide scavenger is present in the de-scaler solution in an amount of 0.01 to 5 weight percent (wt. %), based on a total weight of the de-scaler solution.

In some embodiments, the hydrogen sulfide scavenger neutralizes 0.025 to 0.125 equivalents of the hydrogen sulfide by weight.

In some embodiments, the acid is at least one selected from the group consisting of hydrochloric acid, formic acid, acetic acid, citric acid, N,N-Dicarboxymethyl glutamic acid tetrasodium salt (GLDA), Ethylenediamine tetraacetic acid (EDTA), Hydroxyethyl Ethylenediamine Triacetic Acid (HEDTA), trisodium dicarboxymethyl alaninate (MGDA), Nitrilotriacetic acid (NTA), Diethylenetriamine pentaacetate (DTPA), penta(methylene phosphonic acid) (DTPMP), Hydroxyethylidene Diphosphonic acid (HEDP), and MAC-ROPA.

In another exemplary embodiment, a de-scaler solution is described. The de-scaler solution includes an aqueous solvent, an acid and a hydrogen sulfide scavenger. The hydrogen sulfide scavenger includes particles of a manganese oxide supported on a porous support. The particles are suspended in the aqueous solvent. The porous support is at least one selected from the group consisting of an aluminum oxide, a zirconium oxide, a silicate material, a carbon nanomaterial, a metal organic framework (MOF), and a zeolitic imidazolate framework (ZIF).

In some embodiments, the acid is at least one selected from the group consisting of hydrochloric acid, formic acid, acetic acid, citric acid, N,N-dicarboxymethyl glutamic acid tetrasodium salt (GLDA), ethylenediamine tetraacetic acid (EDTA), hydroxyethyl ethylenediamine triacetic acid (HEDTA), trisodium dicarboxymethyl alaninate (MGDA), nitrilotriacetic acid (NTA), diethylenetriamine pentaacetate (DTPA), penta(methylene phosphonic acid) (DTPMP), hydroxyethylidene diphosphonic acid (HEDP), and MAC-ROPA.

In some embodiments, the acid is hydrochloric acid.

In some embodiments, the hydrochloric acid is present in an amount of 10 to 27 wt. %, based on a total weight of the de-scaler solution.

In some embodiments, the de-scaler solution further includes at least one selected from the group consisting of a surfactant, a corrosion inhibitor, and a corrosion inhibitor intensifier.

In some embodiments, the hydrogen sulfide scavenger has a mean particle size of 100 to 10,000 nm. The particles of the manganese oxide have a mean particle size of 5 to 150 nm and are on at least one selected from the group consisting of an exterior surface of the porous support and within pores of the porous support.

In some embodiments, the hydrogen sulfide scavenger is present in the de-scaler solution in an amount of 0.01 to 5 wt. %, based on a total weight of de-scaler solution.

In some embodiments, the porous support is aluminum oxide.

In some embodiments, the aluminum oxide is gamma (γ) aluminum oxide.

In some embodiments, the hydrogen sulfide scavenger has a molar ratio of manganese to aluminum of 1:1 to 1:5.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the following description, it is understood that other embodiments may be utilized and structural and operational changes may be made without departure from the scope of the present embodiments disclosed herein.

Embodiments of the present disclosure will now be described more fully hereinafter with reference to the accompanying drawings, in which some, but not all embodiments of the disclosure are shown. In the drawings, like reference numerals designate identical or corresponding parts throughout the several views.

Furthermore, the terms "approximately," "approximate," "about," and similar terms generally refer to ranges that include the identified value within a margin of 20%, 10%, or preferably 5%, and any values there between.

As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

As used herein, the terms "optional" or "optionally" means that the subsequently described event(s) can or cannot occur or the subsequently described component(s) may or may not be present (e.g., 0 wt. %).

As used herein, the term "alkyl" unless otherwise specified refers to both branched and straight chain saturated aliphatic primary, secondary, and/or tertiary hydrocarbon fragments of typically $C_1$ to $C_{20}$. Non-limiting examples of such hydrocarbon fragments include methyl, trifluoromethyl, ethyl, propyl, isopropyl, cyclopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, 2,3-dimethylbutyl, 2-ethylhexyl, heptyl, octyl, nonyl, 3,7-dimethyloctyl, decyl, undecyl, dodecyl, tridecyl, 2-propylheptyl, tetradecyl, pentadecyl, hexadecyl, heptadecyl, octadecyl, nonadecyl, and eicosyl.

The term "cycloalkyl" refers to cyclized alkyl groups. Exemplary cycloalkyl groups include, but are not limited to, cyclopropyl, cyclobutyl, cyclopentyl, cyclohexyl, norbornyl, and adamantyl. Branched cycloalkyl groups such as exemplary 1-methylcyclopropyl and 2-methylcyclopropyl groups are included in the definition of cycloalkyl as used in the present disclosure.

The term "alkoxy" refers to a straight or branched chain alkoxy including, but not limited to, methoxy, ethoxy, propoxy, isopropoxy, butoxy, isobutoxy, secondary butoxy, tertiary butoxy, pentoxy, isopentoxy, hexyloxy, heptyloxy, octyloxy, nonyloxy, and decyloxy.

The term "halogen", as used herein, means fluoro, chloro, bromo and iodo.

As used herein, the term "substituted" refers to at least one hydrogen atom is replaced with a non-hydrogen group, provided that normal valencies are maintained and that the substitution results in a stable compound. When a R group (denoted as $R_1$, $R_2$, and so forth) is noted as "optionally substituted", the substituents are selected from the exemplary group including, but not limited to, halogen (e.g., chlorine, bromine, fluorine or iodine), alkoxy (i.e., straight chain alkoxy having 1 to 3 carbon atoms, and includes, for example, methoxy, ethoxy, and propoxy), hydroxy, amino, alkylamino, thiol, alkylthio, sulfonamido (e.g., —$SO_2NH_2$), substituted sulfonamide (e.g., —$SO_2$NHalkyl or cases where there are two alkyl substituents on one nitrogen), nitro, cyano, carboxy, carbamyl (e.g., —$CONH_2$), substituted carbamyl (e.g., —CONHalkyl or cases where there are two alkyl substituents on one nitrogen), and mixtures thereof. The substituents may be either unprotected, or protected as necessary, as known to those skilled in the art, for example, as taught in Greene et al., "Protective Groups in Organic Synthesis", John Wiley and Sons, Second Edition, 1991, hereby incorporated by reference in its entirety).

According to a first aspect, the present disclosure is directed towards a method of removing a sulfide-containing scale using a de-scaler solution. The scale may be removed from a wellbore, pipe, or other metal-containing surface associated with an oil or gas well. For example, sulfide scale may be removed from the inner surfaces of pipelines and equipment handling sour oil or sour gas. The method may also remove the sulfide-containing scale from a wellbore in a subterranean geological formation. The subterranean geological formation may include, but is not limited to, a depleted oil reservoir, a depleted gas reservoir, a sour reservoir, a hydrocarbon bearing subterranean formation, a saline formation, or an un-minable coal bed. The sulfide-containing scale may include one or more of an alkali metal sulfide, a transition metal sulfide, or a metalloid sulfide. Examples of sulfides which may be present in the sulfide-containing scale include, but are not limited to iron sulfide, barium sulfide, calcium sulfide, and strontium sulfide.

A de-scaler solution comprises an aqueous solvent. In some embodiments, the aqueous solvent may include any water containing solution, including saltwater, hard water, and fresh water. As used herein, the term "seawater" may refer to water present in bays, lakes, rivers, creeks, as well as underground water resources, other than water present in oceans. Salts that may be present in saltwater, hard water, and fresh water may be, but are not limited to, cations such as sodium, magnesium, calcium, potassium, ammonium, and iron, and anions such as chloride, bicarbonate, carbonate, sulfate, sulfite, phosphate, iodide, nitrate, acetate, citrate, fluoride, and nitrite.

The de-scaler solution comprises an acid. In some embodiments, the acid is at least one selected from the group consisting of hydrochloric acid, formic acid, acetic acid, citric acid, N,N-dicarboxymethyl glutamic acid tetrasodium salt (GLDA), ethylenediamine tetraacetic acid (EDTA), hydroxyethyl ethylenediamine triacetic Acid (HEDTA), trisodium dicarboxymethyl alaninate (MGDA), nitrilotriacetic acid (NTA), diethylenetriamine pentaacetate (DTPA), penta (methylene phosphonic acid) (DTPMP), hydroxyethylidene diphosphonic acid (HEDP), and MACROPA. In some embodiments, the acid may also include nitric acid, sulphuric acid, carboxic acid, phosphoric acid, hydrobromic acid, glutamic acid, diacetic acid and propionic acid. Certain other acids, however, may not be used. Examples of other acids that may not be used include hydrofluoric acid, silicic acid, orthosilicic acid, fluorosilicic acid, and hexafluorophosphoric acids. Such acids are typically associated with the formation, transformation or precipitation of silicate, fluoride, or fluorinated solids or may be associated with increased corrosion or other degradative process disadvantageous to continued operation of the wellbore, pipe, or other metal-containing surface associated with an oil or gas well. In some embodiments, the acid is hydrochloric acid. In some embodiments, the hydrochloric acid is present in an amount of 10 to 27 wt. %, preferably 11 to 26 wt. %, preferably 12 to 25 wt. %, preferably 13 to 24 wt. %, preferably 14 to 23 wt. %, preferably 15 to 22 wt. %, preferably 16 to 21 wt. %, preferably 17 to 20 wt. %, preferably 18 to 19 wt. %, preferably 18.5 wt. %, based on a total weight of the de-scaler solution.

The de-scaler solution comprises a hydrogen sulfide scavenger. The hydrogen sulfide scavenger comprises particles of a manganese oxide supported on a porous support.

The porous support is at least one selected from the group consisting of an aluminum oxide, a zirconium oxide, a silicate material, a carbon nanomaterial such as carbon nanotubes, a metal organic framework (MOF), and a zeolitic imidazolate framework (ZIF).

In general, the aluminum oxide may be any suitable aluminum oxide known to one of ordinary skill in the art. The aluminum oxide may be any suitable polymorph or combination of polymorphs of aluminum oxide, such as $\alpha$-$Al_2O_3$, $\gamma$-$Al_2O_3$, $\theta$-$Al_2O_3$, and $\kappa$-$Al_2O_3$.

In general, the zirconium oxide may be any suitable zirconium oxide known to one of ordinary skill in the art. The zirconium oxide may be any suitable polymorph or combination of polymorphs of zirconium oxide, such as monoclinic zirconia, tetragonal zirconia, and cubic zirconia.

In general, any suitable silicate and/or aluminosilicate matrix known to one of ordinary skill in the art may be used in the nanomedicinal composition. Examples of such suitable porous silica, silicate, or aluminosilicate materials include, but are not limited to, MCM-41, MCM-48, Q-10 silica, hydrophobic silica, mesobeta, mesoZSM-5, SBA-15, KIT-5, KIT-6, SBA-16, mesoporous silica spheres, zeolitic materials, and halloysite. The term "silicate matrix" should be understood to include silica itself. Methods of obtaining the various types porous silica, silicate, or aluminosilicate material are well-known in the art [see for example Gobin, Oliver Christian "SBA-16 Materials: Synthesis, Diffusion, and Sorption Properties" Dissertation, Laval University, Ste-Foy, Quebec, Canada, January 2006, in particular section 2.2; and U.S. patent application Ser. No. 15/478,794—both incorporated herein by reference in their entireties]. Aluminosilicate materials may be characterized by a ratio of Si to Al present in the material. In general, the aluminosilicate material may have any suitable Si:Al molar ratio. Examples of such suitable Si:Al molar ratios are 1000:1 to 1:250, preferably 500:1 to 1:200, preferably 250:1 to 1:100, preferably 150:1 to 1:75, preferably 100:1 to 1:50, preferably 50:1 to 1:25, preferably 25:1 to 1:10, preferably 10:1 to 1:5, preferably 5:1 to 1:2.5, preferably 2.5:1 to 1:1.5, preferably 1.5:1 to 1:1. In general, the elemental composition of the silicate and/or aluminosilicate material, including the Si:Al molar ratio, may be determined by any suitable technique known to one of ordinary skill in the art. Examples of suitable such techniques include mass spectrometry techniques such as inductively-coupled plasma mass spectrometry (ICP-MS), atomic emission spectroscopy techniques such as inductively-coupled plasma atomic emission spectroscopy (ICP-AES) (also referred to as ICP optical emission spectroscopy, ICP-OES), atomic absorption spectroscopy techniques such as inductively-coupled plasma atomic absorption spectroscopy (ICP-AAS), and X-ray spectroscopy techniques such as X-ray photoelectron spectroscopy.

Silicates and aluminosilicates are materials which comprise $SiO_4$ tetrahedra (and $AlO_4^-$ tetrahedra, $AlO_6$ octahedra, and/or $Al(OH)_6$ octahedra in the case of aluminosilicates) joined together in a wide variety of structural motifs. The tetrahedra (and if applicable octahedra) in the silicate and/or aluminosilicate material of the present invention may in general adopt any structural motif present in other silicate materials, such as isolated tetrahedra as in neosilicates (single tetrahedra, also called orthosilicates) and sorosilicates (double tetrahedra), chains of tetrahedra such as inosilicates (both single chain as in pyroxene group silicates and double chain as in amphibole group silicates), rings of tetrahedra as in cyclosilicates, sheets of tetrahedra as in phyllosilicates, and three-dimensional frameworks as in tectosilicates. In some aluminosilicates, the material comprises a substructure comprising silicon-containing and/or aluminum-containing tetrahedral and a substructure comprising aluminum-containing octahedral. An example of such an arrangement is the mineral kaolin, which comprises sheets of alternating tetrahedra-containing layers and octahedra-containing layers. The arrangement of isolated tetrahedra, chains of tetrahedra, sheets of tetrahedra, or three-dimensional frameworks may give rise to channels, pores, cages, or other spaces within the silicate and/or aluminosilicate which is capable of hosting material which is not the silicate and/or aluminosilicate itself. Examples of materials, particularly those relevant to the current disclosure, include water, organic molecules, and inorganic nanoparticles. While the larger structures formed of tetrahedra (i.e. chains, rings, sheets, and three-dimensional frameworks) may themselves be ordered, the arrangement of these larger structures may be disordered. Such disorder may give rise to a material which is amorphous by techniques for determining crystallinity or crystal structure such as powder X-ray diffraction (PXRD). Alternatively, the larger structures may be ordered, giving rise to a crystalline material.

MCM-41 (Mobil Composition of Matter No. 41) is a mesoporous silica material with a hierarchical structure from a family of silicate and aluminosilicate solids that were developed by researchers at Mobil Oil Corporation and that can be used as catalysts or catalyst supports. MCM-41 and MCM-48 both comprise an amorphous silica wall and possess long range ordered framework with uniform mesopores. These materials also possess large surface area, which can be up to more than 1,000 $m^2g^{-1}$. The pore diameter of these materials can be controlled to fall within a mesoporous range between 1.5 and 20 nm by adjusting the synthesis conditions and/or by employing surfactants with different chain lengths in their preparation. In embodiments where the porous silicate matrix is MCM-41, the nanocarrier may be referred to as a "MCM-41 nanocarrier".

KIT-6 is a mesoporous silica material. KIT-6 has a bicontinuous cubic mesostructure with Ia3d symmetry. KIT-6 is characterized by an interpenetrating cylindrical pore system. Such pores typically have a pore size from about 3.5 to about 18.5 nm and can be controlled by various parameters during the synthesis such as synthesis temperature.

Halloysite is a naturally occurring clay material comprising nanotubes made of aluminosilicate kaolin sheets rolled into a tube shape. Sometimes the kaolin sheets are rolled several times. As described above, such kaolin sheets comprise a tetrahedral layer comprising silicon-containing tetrahedra and an octahedral layer comprising aluminum-containing octahedral. These sheets are typically rolled to place the tetrahedral layer on the exterior surface of the nanotube and the octahedral layer on the interior surface of the nanotube. The silicon-rich tetrahedral layer gives the halloysite nanotube an exterior surface rich in siloxane functional groups and typically a negative charge. The aluminum-rich octahedral layer gives the halloysite nanotube an interior surface rich in aluminol functional groups and typically a positive charge. The size and shape of halloysite nanotubes are typically defined by a nanotube outer diameter, a nanotube length, and sometimes an aspect ratio. Sometimes an inner diameter or a nanotube wall thickness is also used to further define the size and shape of nanotubes. In some embodiments, the halloysite nanotubes have a mean nanotube outer diameter of 10 to 125 nm, preferably 12.5 to 110 nm, preferably 15 to 100 nm, preferably 17.5 to 95 nm, preferably 20 to 90 nm, preferably 22.5 to 85 nm, preferably 25 to 80 nm, preferably 27.5 to 75 nm, preferably 30 to 70 nm. In some embodiments, the halloysite nanotubes have a mean inner diameter of 5 to 22.5 nm, preferably 7.5 to 20 nm, preferably 10 to 17.5 nm, preferably 11 to 16 nm, preferably 12 to 15 nm. In some embodiments, the halloysite nanotubes have a mean nanotube length of 0.25 to 7.5 μm, preferably 0.35 to 7 μm, preferably 0.5 to 5 μm preferably 0.75 to 4 μm, preferably 0.9 to 3.5 μm, preferably 1 to 3 μm. In some embodiments, the halloysite nanotubes have an aspect ratio of 2:1 to 750:1, preferably 5:1 to 500:1, preferably 7.5:1 to 250:1, preferably 10:1 to 150:1, preferably 12.5:1 to 125:1, preferably 14:1 to 100:1.

The shape of the halloysite nanotubes, being hollow, gives the halloysite nanotubes an interior surface and an exterior surface. In some embodiments, the interior surface is substantially the same as the exterior surface. In this context, "substantially the same" may refer to or be measured by any suitable structural or functional parameter or property known to one of ordinary skill in the art. Examples of such suitable structural parameters or properties include, but are not limited to chemical composition (including in particular Si:Al molar ratio), charge identity or density, orientation of tetrahedra, porosity, crystallographic characteristic such as strain or orientation, functional group identity or density, and binding or adsorption affinity for organic molecules and/or inorganic materials. In alternative embodiments, the interior surface is not substantially the same as the exterior surface. In some embodiments, the halloysite nanotubes have an exterior surface which is negatively charged and an interior surface which is positively charged. In some embodiments, such a charge difference is the result of a compositional difference between the exterior surface and the interior surface. Such a compositional difference may be in the form of a difference in an amount of silicon and/or aluminum present. In some embodiments, the exterior surface is silicon-rich (e.g. having a Si:Al molar ratio of approximately 1000:1 to 5:1). In some embodiments, the interior surface is aluminum-rich (e.g. having a Si:Al molar ratio of 1:2.5 to 1:250).

The shape of the halloysite nanotubes encloses an interior volume bound by the interior surface of the nanotube. The interior volume may be substantially cylindrical in shape. The halloysite nanotubes have at least one (preferably both) ends open, permitting substances to pass into the interior volume through said open ends. Materials (e.g. the cerium oxide nanoparticles and/or pharmaceutical agent mixture) may be contained within the interior volume. Such materials may remain within the interior volume though interaction with the interior surface of the halloysite nanotube. In some embodiments, the layers of the silicate and/or aluminosilicate material may further comprise in-layer pores. Such in-layer pores are preferably oriented substantially perpendicular to the length of the nanotube. The in-layers pores may allow access to the interior volume or to an interlayer volume described below. Such pores may comprise a pore wall. This pore wall is a distinct surface from the interior surface and the exterior surface of the halloysite nanotube. The pore wall may be substantially the same as one or both of the interior surface and the exterior surface of the halloysite nanotube. Alternatively, the pore wall may be distinct from the interior surface or the exterior surface in terms of properties such as chemical composition (including in particular Si:Al molar ratio), charge identity or density, orientation of tetrahedra, crystallographic characteristic such as strain or orientation, functional group identity or density, and binding or adsorption affinity for organic molecules and/or inorganic materials. Embodiments in which the halloysite nanotubes comprise more than one layer of silicate and/or aluminosilicate material, the nanotubes may further comprise an interlayer volume defined between the layers. The interlayer volume may be defined by an inner interlayer surface and an outer interlayer surface. Due to the orientation, the inner interlayer surface may be substantially the same as the exterior surface of the halloysite nanotube while the outer interlayer surface may be substantially the same as the interiors surface of the nanotube. The interlayer volume may be accessible at the open ends of the halloysite nanotubes or by in-layer pores described above.

As used herein, the term "zeolitic material" refers to a material having the crystalline structure or three-dimensional framework of, but not necessarily the elemental composition of, a zeolite. Zeolites are porous silicate or aluminosilicate minerals that occur in nature. Elementary building units of zeolites are $SiO_4$ (and if appropriate, $AlO_4$) tetrahedra. Adjacent tetrahedra are linked at their corners via a common oxygen atom, which results in an inorganic macromolecule with a three-dimensional framework (frequently referred to as the zeolite framework). The three-dimensional framework of a zeolite also comprises channels, channel intersections, and/or cages having dimensions in the range of 0.1-10 nm, preferably 0.2-5 nm, more preferably 0.2-2 nm. Water molecules may be present inside these channels, channel intersections, and/or cages. Zeolites which are devoid of aluminum may be referred to as "all-silica zeolites" or "aluminum-free zeolites". Some zeolites which are substantially free of, but not devoid of, aluminum are referred to as "high-silica zeolites". Sometimes, the term "zeolite" is used to refer exclusively to aluminosilicate materials, excluding aluminum-free zeolites or all-silica zeolites.

In some embodiments, the zeolitic material has a three-dimensional framework that is at least one zeolite framework selected from the group consisting of a 4-membered ring zeolite framework, a 6-membered ring zeolite framework, a 10-membered ring zeolite framework, and a 12-membered ring zeolite framework. The zeolite may have a natrolite framework (e.g. gonnardite, natrolite, mesolite, paranatrolite, scolecite, and tetranatrolite), edingtonite framework (e.g. edingtonite and kalborsite), thomsonite framework, analcime framework (e.g. analcime, leucite, pollucite, and wairakite), phillipsite framework (e.g. harmotome), gismondine framework (e.g. amicite, gismondine, garronite, and gobbinsite), chabazite framework (e.g. chabazite-series, herschelite, willhendersonite, and SSZ-13), faujasite framework (e.g. faujasite-series, Linde type X, and Linde type Y), mordenite framework (e.g. maricopaite and mordenite), heulandite framework (e.g. clinoptilolite and heulandite-series), stilbite framework (e.g. barrerite, stellerite, and stilbite-series), brewsterite framework, or cowlesite framework. In some embodiments, the porous silicate and/or aluminosilicate matrix is a zeolitic material having a zeolite framework selected from the group consisting of ZSM-5, ZSM-8, ZSM-11, ZSM-12, ZSM-18, ZSM-23, ZSM-35 and ZSM-39.

In some embodiments, the porous silicate and/or aluminosilicate matrix is surface modified prior to use in the nanocarrier. Such surface modifications may change the surface properties of the porous silicate and/or aluminosilicate matrix, for example by increasing or decreasing the number or concentration of functional groups found on an unmodified porous silicate and/or aluminosilicate matrix or by introducing new functional groups to the porous silicate and/or aluminosilicate matrix. Examples of such new functional groups include, but are not limited to carboxylic acid or carboxylate groups, amine or ammonium groups, sulfo groups, and phosphate groups. Such functional groups may be charged or uncharged. In some embodiments, the surface modification changes the surface charge of the interior surface, the exterior surface, the pore surface, or any combination thereof of the modified porous silicate and/or aluminosilicate matrix compared to unmodified porous silicate and/or aluminosilicate matrix. Preferably, the surface modification does not change the surface charge of the interior surface, exterior surface, pore surface, or any combination thereof of the modified porous silicate and/or aluminosilicate matrix compared to unmodified porous silicate and/or aluminosilicate matrix. Such surface modification may be performed using any suitable method or with any suitable surface modifying agent or agents known to one of ordinary skill in the art. One example of such a method is the use of silanes or organosilicates bearing one or more functional groups to be added by the surface modification. Such surface modification may result in said functional groups being attached to the porous silicate and/or aluminosilicate matrix by covalent bonds. Alternatively, said functional groups may be attached to the porous silicate and/or aluminosilicate matrix by a non-covalent interaction, for example electrostatic interaction, physisorption, or hydrogen bonding. In some embodiments, the surface modifying agent(s) are substantially free of silanes. In some embodiments, the surface modifying agent(s) are substantially free of organosilicates. In some embodiments, the surface modifying agent(s) are substantially free of amino acids. In some embodiments, the surface modifying agent(s) are substantially free of short peptides (i.e. 2-20 residues). In some embodiments, the surface modifying agent(s) are substantially free of chromium salts (chrome alum, chromium acetate, etc.); calcium salts (calcium chloride, calcium hydroxide, etc.); aluminum salts (aluminum chloride, aluminumhydroxide, etc.); dialdehydes (glutaraldehyde, etc.); carbodiimides (EDC, WSC, N-hydroxy-5-norbomene-2,3-di-carboxylmide (HONB), N-hydroxysuccinic acid imide (HOSu), dicyclohexylcarbodiimide (DCC), etc.); N-hydroxysuccinimide; and/or phosphorus oxychloride. In some embodiments, the surface modifying agent(s) are substantially free of proteins. Examples of such proteins include, but are not limited to collagen, gelatin, albumin, ovalbumin, casein, transferrin, fibrin, and fibrinogen.

In general, the carbon nanomaterial may be any suitable carbon nanomaterial known to one of ordinary skill in the art. Examples of carbon nanomaterials include carbon nanotubes, carbon nanobuds, carbon nanoscrolls, carbon dots, activated carbon, carbon black, graphene, graphene oxide, reduced graphene oxide, and nanodiamonds. In some embodiments, the carbon nanomaterial is at least one selected from the group consisting of graphene, graphene oxide, reduced graphene oxide, carbon nanotubes, carbon dots, and activated carbon.

In some embodiments, the carbon nanomaterial is carbon nanotubes. The carbon nanotubes may, in general, be any suitable carbon nanotubes known to one of ordinary skill in the art. Carbon nanotubes may be classified by structural properties such as the number of walls or the geometric configuration of the atoms that make up the nanotube. Classified by their number of walls, the carbon nanotubes can be single-walled carbon nanotubes (SWCNT) which have only one layer of carbon atoms arranged into a tube, or multi-walled carbon nanotubes (MWCNT), which have more than one single-layer tube of carbon atoms arranged so as to be nested, one tube inside another, each tube sharing a common orientation. Closely related to MWNTs are carbon nanoscrolls. Carbon nanoscrolls are structures similar in shape to a MWCNT, but made of a single layer of carbon atoms that has been rolled onto itself to form a multi-layered tube with a free outer edge on the exterior of the nanoscroll and a free inner edge on the interior of the scroll and open ends. The end-on view of a carbon nanoscroll has a spiral-like shape. For the purposes of this disclosure, carbon nanoscrolls are considered a type of MWCNT. Classified by the geometric configuration of the atoms that make up the nanotube, carbon nanotubes can be described by a pair of integer indices n and m. The indices n and m denote the number of unit vectors along two directions in the honeycomb crystal lattice of a single layer of carbon atoms. If m=0, the nanotubes are called zigzag type nanotubes. If n=m, the nanotubes are called armchair type nanotubes. Otherwise they are called chiral type nanotubes. In some embodiments, the carbon nanotubes are metallic. In other embodiments, the carbon nanotubes are semiconducting. In some embodiments, the carbon nanotubes are SWCNTs. In other embodiments, the carbon nanotubes are MWCNTs. In some embodiments, the carbon nanotubes are carbon nanoscrolls. In some embodiments, the carbon nanotubes are zigzag type nanotubes. In alternative embodiments, the carbon nanotubes are armchair type nanotubes. In other embodiments, the carbon nanotubes are chiral type nanotubes.

In some embodiments, the carbon nanomaterial is graphene. In some embodiments, the carbon nanomaterial is graphene nanosheets. Graphene nanosheets may consist of stacks of graphene sheets, the stacks having an average thickness and a diameter. In some embodiments, the stacks comprise 1 to 60 sheets of graphene, preferably 2 to 55 sheets of graphene, preferably 3 to 50 sheets of graphene.

In some embodiments, the graphene is in the form of graphene particles. The graphene particles may have a spherical shape, or may be shaped like blocks, flakes, ribbons, discs, granules, platelets, angular chunks, rectangular prisms, or some other shape. In some embodiments, the graphene particles may be substantially spherical, meaning that the distance from the graphene particle centroid (center of mass) to anywhere on the graphene outer surface varies by less than 30%, preferably by less than 20%, more preferably by less than 10% of the average distance. In some embodiments, the graphene particles may be in the form of agglomerates.

In some embodiments, the graphene is pristine graphene. Pristine graphene refers to graphene that has not been oxidized or otherwise functionalized. Pristine graphene may be obtained by methods such as exfoliation, chemical vapor deposition synthesis, opening of carbon nanotubes, unrolling of carbon nanoscrolls, and the like. In alternative embodiments, the graphene is functionalized graphene. Functionalized graphene is distinguished from pristine graphene by the presence of functional groups on the surface or edge of the graphene that contain elements other than carbon and hydrogen. In other alternative embodiments, the graphene is graphene oxide. Graphene oxide refers to graphene that has various oxygen-containing functionalities that are not present in pristine graphene. Examples of such oxygen-containing functionalities include epoxides, carbonyl, carboxyl, and hydroxyl functional groups. Graphene oxide is sometimes considered to be a type of functionalized graphene.

In other alternative embodiments, the graphene is reduced graphene oxide. Reduced graphene oxide (rGO) refers to graphene oxide that has been chemically reduced. It is distinct from graphene oxide in it contains substantially fewer oxygen-containing functionalities compared to graphene oxide, and it is distinct from pristine graphene by the presence of oxygen-containing functionalities and structural defects in the carbon network. Reduced graphene oxide is sometimes considered to be a type of functionalized graphene. In preferred embodiments, the carbon nanomaterial is reduced graphene oxide. The reduced graphene oxide may exist as nanosheets, particles having a spherical shape, or may be shaped like blocks, flakes, ribbons, discs, granules, platelets, angular chunks, rectangular prisms, or some other shape as described above, agglomerates as described above, or any other shape known to one of ordinary skill in the art.

In some embodiments, the carbon nanoparticles are activated carbon. Activated carbon refers to a form of porous carbon having a semi-crystalline, semi-graphitic structure and a large surface area. Activated carbon may be in the form of particles or particulate aggregates having micropores and/or mesopores. Activated carbon typically has a surface area of approximately 500 to 5000 $m^2/g$. The activated carbon particles may have a spherical shape, or may be shaped like sheets, blocks, flakes, ribbons, discs, granules, platelets, angular chunks, rectangular prisms, or some other shape. In some embodiments, the activated carbon particles may be substantially spherical, meaning that the distance from the activated carbon particle centroid (center of mass) to anywhere on the activated carbon particle outer surface varies by less than 30%, preferably by less than 20%, more preferably by less than 10% of the average distance.

In some embodiments, the carbon nanoparticles are carbon black. Carbon black refers to having a semi-crystalline, semi-graphitic structure and a large surface area. Carbon black may be distinguished from activated carbon by a comparatively lower surface area, typically 15 to 500 $m^2/g$ for carbon black. Additionally, carbon black may lack the requisite micropores and mesopores of activated carbon. The carbon black particles may have a spherical shape, or may be shaped like sheets, blocks, flakes, ribbons, discs, granules, platelets, angular chunks, rectangular prisms, or some other shape.

In some embodiments, the particles of a carbon nanomaterial are a single type of particle as described above. In this context, "a single type of particle" may refer to particles of a single carbon nanomaterial, particles which have substantially the same shape, particles which have substantially the same size, or any combination of these. In alternative embodiments, mixtures of types of particles are used.

The International Union of Pure and Applied Chemistry (IUPAC) states that a metal organic framework (MOF) is a coordination network with organic ligands containing potential voids. A coordination network is a coordination compound extending, through repeating coordination entities, in one dimension, but with cross-links between two or more individual chains, loops, or spiro-links, or a coordination compound extending through repeating coordination entities in two or three dimensions; and finally a coordination polymer is a coordination compound with repeating coordination entities extending in one, two, or three dimensions. A coordination entity is an ion or neutral molecule that is composed of a central atom, usually that of a metal, to which is attached a surrounding array of atoms or groups of atoms, each of which is called ligands. More succinctly, a metal organic framework is characterized by metal ions or clusters coordinated to organic ligands to form one-, two-, or three-dimensional structures. Typically, a MOF exhibits a regular void or pore structure. The nature of the void or pore structure, including properties or structural factors such as the geometry about the metal ions or clusters, the arrangement of the linkages between metal ions or clusters, and the number, identity, and spatial arrangement of voids or pores. These properties may be described as the structure of the repeat units and the nature of the arrangement of the repeat units. The specific structure of the MOF, which may include the void or pore structure is typically referred to as the MOF topology.

The metal-organic framework comprises a metal ion which is an ion of at least one metal selected from the group consisting of a transition metal (e.g. Sc, Ti, V, Cr, Mn, Fe, Co, Ni, Cu, Y, Zr, Nb, Mo, Tc, Ru, Rh, Pd, Ag, Hf, Ta, W, Re, Os, Ir, Pt, Au, Rf, Db, Sg, Bh, Hs, Mt, Ds, Rg, and Cn), a post-transition metal (e.g. Al, In, Ga, Sn, Bi, Pb, Tl, Zn, Cd, and Hg), and an alkaline earth metal (e.g. Be, Mg, Ca, Sr, Ba, and Ra). Further, these metal ions may be of any oxidation state $M^{+1}$, $M^{+2}$, $M^{+3}$, etc. In one or more embodiments, the metal ion is an ion of at least one metal selected from the group consisting of Zn, Cu, Fe, Ni, Co, Mn, Cr, Cd, Mg, Ca, and Zr.

In the formation of a metal organic framework, the organic ligands must meet certain requirements to form coordination bonds, primarily being multi-dentate, having at least two donor atoms (i.e. N—, and/or O—) and being neutral or anionic. The structure of the metal organic framework is also affected by the shape, length, and functional groups present in the organic linker. In certain embodiments, the metal organic framework of the present disclosure comprises anionic ligands as organic ligands. In one or more embodiments, the organic ligands may have at least two nitrogen donor atoms. For example, the organic ligands may be imidazolate-based, imidazole-derived or ligands similar to an imidazole including, but not limited to, optionally substituted imidazoles, optionally substituted benzimidazoles, optionally substituted imidazolines, optionally substituted pyrazoles, optionally substituted thiazoles, and optionally substituted triazoles. In a preferred embodiment, the metal organic framework of the present disclosure in any of its embodiments comprises 2-methylimidazole and 5-methylbenzimidazole as the organic ligands. 2-Methylimidazole and 5-methylbenzimidazole organic ligands have free nitrogen atoms that may each form a coordinative bond to the metal ions (e.g. Zn(II)) to produce a coordination network.

In one or more embodiments, the ligand comprises an imidazole of formula (I) and a benzimidazole of formula (II):

wherein $R_1$, $R_2$, $R_3$, $R_4$, $R_5$, $R_6$, $R_7$, and $R_8$ are each independently selected from the group consisting of a hydrogen, an optionally substituted alkyl, an optionally substituted cycloalkyl, an optionally substituted alkoxy, a hydroxyl, a halogen, a nitro, and a cyano. Preferably, $R_1$, $R_2$, $R_3$, $R_4$, $R_5$, $R_6$, $R_7$, and $R_8$ are each independently a hydrogen, an optionally substituted $C_1$-$C_3$ alkyl group, or an optionally substituted $C_3$-$C_6$ cycloalkyl group. More preferably, $R_1$, $R_2$, $R_3$, $R_4$, $R_5$, $R_6$, $R_7$, and $R_8$ are each independently a hydrogen or a methyl.

Exemplary imidazole-based ligands that may be applicable to the current disclosure include, but are not limited to, imidazole, 2-methylimidazole, 4-methylimidazole, 2-ethylimidazole, 2-isopropylimidazole, 4-tert-butyl-1H-imidazole, 2-ethyl-4-methylimidazole, 2-bromo-1H-imidazole, 4-bromo-1H-imidazole, 2-chloro-1H-imidazole, 2-iodoimidazole, 2-nitroimidazole, 4-nitroimidazole, (1H-imidazol-2-yl)methanol, 4-(hydroxymethyl)imidazole, 2-aminoimidazole, 4-(trifluoromethyl)-1H-imidazole, 4-cyanoimidazole, 3H-imidazole carboxylic acid, 4-imidazolecarboxylic acid, imidazole-2-carboxylic acid, 2-hydroxy-1H-imidazole-4-carboxylic acid, 4,5-imidazoledicarboxylic acid, 5-iodo-2-methyl-1H-imidazole, 2-methyl-4-nitroimidazole, 2-(aminomethyl)imidazole, 4,5-dicyanoimidazole, 4-imidazoleacetic acid, 4-methyl-5-imidazolemethanol, 1-(4-methyl-1H-imidazol-5-yl)methanamine, 4-imidazoleacrylic acid, 5-bromo-2-propyl-1H-imidazole, ethyl-(1H-imidazol-2-ylmethyl)-amine, and 2-butyl-5-hydroxymethylimidazole. In preferred embodiments, the imidazole of formula (I) is 2-methylimidazole.

Exemplary benzimidazole-based ligands that may be applicable to the current disclosure include, but are not limited to, benzimidazole, 5-methylbenzimidazole, 2-methylbenzimidazole, 5-chlorobenzimidazole, 5-bromobenzimidazole, 5,6-dimethylbenzimidazole, 5-methoxybenzimidazole, 2-chlorobenzimidazole, 2-bromo-1H-benzimidazole, 6-bromo-1H-benzimidazole, 5-fluoro-1H-benzimidazole, 5-chloro-2-methylbenzimidazole, methyl benzimidazole-2-acetate, 1H-benzoimidazol-4-ol, 1H-benzimidazol-5-ylmethanol, 2-benzimidazolemethanol, 4-chloro-6-(trifluoromethyl)benzimidazole, 5-chloro-2-(trichloromethyl)benzimidazole, 5-cyanobenzimidazole, (2-benzimidazolyl)acetonitrile, (5-chloro-1H-benzimidazol-2-yl)methanol, 2-(chloromethyl)benzimidazole, 5-iodo-2-methylbenzimidazole, (5-chloro-1H-benzimidazol-2-yl)methylamine, 2-(aminomethyl)benzimidazole, 2-(6-chloro-1H-benzimidazol-2-yl)ethanol, 2-(1H-benzoimidazol-2-yl)-acetamide, (6-methoxy-1H-benzimidazol-2-yl)methanol, 5,6-dimethoxybenzimidazole, 2-(1H-benzoimidazol-2-yl)-ethylamine, 1-(5-methyl-1H-benzimidazol-2-yl)methanamine, 1-(5-methyl-1H-benzimidazol-2-yl)ethanamine, 2-benzimidazolepropionic acid, 2-(5-methyl-1H-benzimidazol-2-yl)ethanamine, 2-(3-hydroxy-N-propyl)-5-(trifluoromethyl)-benzimidazole, and N-methyl-1-(5-methyl-1H-benzimidazol-2-yl)methanamine. In preferred embodiments, the benzimidazole of formula (II) is 5-methylbenzimidazole.

In one or more embodiments, a molar ratio between the imidazole of formula (I) to the benzimidazole of formula (II) ranges from 1:1 to 1:4, preferably 2:3 to 2:7, more preferably 4:7 to 1:3, even more preferably 5:9 to 2:5, or about 1:2.

Metal organic frameworks comprising such imidazole or benzimidazole ligands are typically referred to as zeolitic imidazolate frameworks (ZIFs). In some embodiments, the metal organic framework is a zeolitic imidazolate framework. Examples of suitable metal organic frameworks include, but are not limited to isoreticular metal organic framework-3 (IRMOF-3), MOF-69A, MOF-69B, MOF-69C, MOF-70, MOF-71, MOF-73, MOF-74, MOF-75, MOF-76, MOF-77, MOF-78, MOF-79, MOF-80, DMOF-1-NH2, UMCM-1-NH2, MOF-69-80, ZIF-1, ZIF-2, ZIF-3, ZIF-4, ZIF-5, ZIF-6, ZIF-7, ZIF-9, ZIF-10, ZIF-11, ZIF-12, ZIF-14, ZIF-20, ZIF-21, ZIF-22, ZIF-23, ZIF-25, ZIF-60, ZIF-61, ZIF-62, ZIF-63, ZIF-64, ZIF-65, ZIF-66, ZIF-67, ZIF-68, ZIF-69, ZIF-70, ZIF-71, ZIF-72, ZIF-73, ZIF-74, ZIF-75, ZIF-76, ZIF-77, ZIF-78, ZIF-79, ZIF-80, ZIF-81, ZIF-82, ZIF-90, ZIF-91, ZIF-92, ZIF-93, ZIF-94, ZIF-96, ZIF-97, ZIF-100, ZIF-108, ZIF-303, ZIF-360, ZIF-365, ZIF-376, ZIF-386, ZIF-408, ZIF-410, ZIF-412, ZIF-413, ZIF-414, ZIF-486, ZIF-516, ZIF-586, ZIF-615, and ZIF-725.

In some embodiments, the porous support is aluminum oxide. In some embodiments, the aluminum oxide is gamma (γ) aluminum oxide.

In some embodiments, the porous support is present in the form of particles. In general, the porous support particles can be any shape known to one of ordinary skill in the art. Examples of suitable shapes the metal organic framework particles may take include spheres, spheroids, lentoids, ovoids, solid polyhedra such as tetrahedra, cubes, octahedra, icosahedra, dodecahedra, rectangular prisms, triangular prisms (also known as nanotriangles), nanoplatelets, nanodisks, nanotubes, blocks, flakes, discs, granules, angular chunks, and mixtures thereof.

In some embodiments, the porous support particles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of me porous support particles having a different shape. As used herein, the term "non-uniform shape" refers to an average consistent shape that differs by more than 10% of the distribution of porous support particles having a different shape. In one embodiment, the shape is uniform and at least 90% of the porous support particles are spherical or substantially circular, and less than 10% are polygonal. In another embodiment, the shape is non-uniform and less than 90% of the porous support particles are spherical or substantially circular, and greater than 10% are polygonal.

In some embodiment, the porous support is in the form of particles having a mean particle size of 100 to 10,000 nm, preferably 125 to 9,500 nm, preferably 150 to 9,000 nm, preferably 175 to 8,500 nm preferably 200 to 8,000 nm, preferably 250 to 7,500 nm. In embodiments where the porous support particles are spherical, the particle size may refer to a particle diameter. In embodiments where the porous support particles are polyhedral, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the porous support particles have an anisotropic shape such as nanorods or nanotubes, the particle size may refer to a length of the nanorod or nanotube, a width of the nanorod or nanotube, or an average of the length and width of the nanorod or nanotube. In some embodiments, the particle size refers to the diameter of a sphere having an equivalent volume as the particle.

The hydrogen sulfide scavenger comprises particles of the manganese oxide. These particles of manganese oxide are disposed on at least one selected from an exterior surface of the porous support and within pores of the porous support. The particles of manganese oxide (manganese oxide particles) can comprise any suitable manganese oxide or combination of manganese oxides. Various manganese oxides are known, examples of which include but are not limited to MnO, $Mn_3O_4$, $Mn_2O_3$, $MnO_2$, $MnO_3$, $Mn_2O_7$, $Mn_5O8$, $Mn_7O_{12}$ and $Mn_7O_{13}$. Manganese oxide particles may contain a single type of manganese oxide or may contain more than one type of manganese oxide. Multiple types of manganese oxide particles may be used, which differ in various properties such as identity of composition of manganese oxides, size, shape, or other similar property. In general, the manganese oxide particles may have any suitable shape as described above. The shape may be uniform or non-uniform. In some embodiments, the manganese oxide particles have a mean particle size of 5 to 150 nm, preferably 7.5 to 125 nm, preferably 10 to 100 nm.

In some embodiments, the hydrogen sulfide scavenger has a molar ratio of manganese to aluminum of 1:1 to 1:5, preferably 1:2 to 1.4.5, preferably 1:3 to 1:4.25, preferably 1:4.

In some embodiments, the hydrogen sulfide scavenger is present in the de-scaler solution in an amount of 0.01 to 5 wt. %, preferably 0.05 to 4 wt. %, preferably 0.075 to 3.5 wt. %, preferably 0.1 to 3 wt. %, preferably 0.125 to 2.5 wt. %, preferably 0.15 to 2 wt. %, preferably 0.175 to 1.5 wt %, preferably 0.2 to 1 wt %., based on the total weight of the de-scaler solution.

In some embodiments, the de-scaler solution comprises a secondary $H_2S$ scavenger. In some embodiments, the secondary $H_2S$ scavenger may include copper compounds such as copper oxide, copper sulfate, copper molybdate, copper hydroxide, copper halide, copper carbonate, copper hydroxy carbonate, copper carboxylate, copper phosphate, copper hydrates and derivatives thereof; calcium salts, cobalt salts, nickel salts, lead salts, tin salts, zinc salts, iron salts, manganese salts, zinc oxide, iron oxides, manganese oxides, triazine, monoethanolamine, diethanolamine, caustic soda, formaldehyde, glyoxylic acid, potassium permanganate, and combinations thereof. In some embodiments, concentration of the potassium permanganate may be as high as a solubility limit in the de-scaler solution at a given temperature and pressure.

In some embodiments, the de-scaler solution comprises a surfactant. As used herein, the term "surfactant" refers to a compound that lowers the surface tension (or interfacial tension) between two liquids, between a liquid and a gas, or between a liquid and a solid. The surfactant may be a nonionic surfactant, an anionic surfactant, a cationic surfactant, a viscoelastic surfactant, or a zwitterionic surfactant. The surfactant may also be a gemini surfactant of any of the types listed previously. The surfactant may serve a role as a water-wetting agent, a defoamer, a foamer, a detergent, a dispersant, or an emulsifier.

A surfactant molecule comprises one or more hydrophilic head units attached to one or more hydrophobic tails. The tail of most surfactants comprises a hydrocarbon chain, which can be branched, linear, or aromatic. Fluorosurfactants have fluorocarbon chains. Siloxane surfactants have siloxane chains. Gemini surfactant molecules comprise two or more hydrophilic heads and two or more hydrophobic tails.

Many surfactants include a polyether chain terminating in a highly polar anionic group. The polyether groups often comprise ethoxylated (polyethylene oxide-like) sequences inserted to increase the hydrophilic character of a surfactant. Alternatively, polypropylene oxides may be inserted to increase the lipophilic character of a surfactant.

Anionic surfactants contain anionic functional groups at their head, such as sulfate, sulfonate, phosphate, and carboxylate. The anionic surfactant may be an alkyl sulfate, an alkyl ether sulfate, an alkyl ester sulfonate, an alpha olefin sulfonate, a linear alkyl benzene sulfonate, a branched alkyl benzene sulfonate, a linear dodecylbenzene sulfonate, a branched dodecylbenzene sulfonate, an alkyl benzene sulfonic acid, a dodecylbenzene sulfonic acid, a sulfosuccinate, a sulfated alcohol, a ethoxylated sulfated alcohol, an alcohol sulfonate, an ethoxylated and propoxylated alcohol sulfonate, an alcohol ether sulfate, an ethoxylated alcohol ether sulfate, a propoxylated alcohol sulfonate, a sulfated nonyl phenol, an ethoxylated and propoxylated sulfated nonyl phenol, a sulfated octyl phenol, an ethoxylated and propoxylated sulfated octyl phenol, a sulfated dodecyl phenol, and an ethoxylated and propoxylated sulfated dodecyl phenol. Other anionic surfactants include ammonium lauryl sulfate, sodium lauryl sulfate (sodium dodecyl sulfate, SLS, or SDS), and related alkyl-ether sulfates sodium laureth sulfate (sodium lauryl ether sulfate or SLES), sodium myreth sulfate, docusate (dioctyl sodium sulfosuccinate), perfluorooctanesulfonate (PFOS), perfluorobutanesulfonate, alkyl-aryl ether phosphates, and alkyl ether phosphates.

Cationic surfactants have cationic functional groups at their head, such as primary and secondary amines. Cationic surfactants include octenidine dihydrochloride; cetrimonium bromide (CTAB), cetylpyridinium chloride (CPC), benzalkonium chloride (BAC), benzethonium chloride (BZT), dimethyldioctadecylammonium chloride, and dioctadecyldimethylammonium bromide (DODAB).

Zwitterionic (amphoteric) surfactants have both cationic and anionic groups attached to the same molecule. Zwitterionic surfactants include CHAPS (3-[(3-cholamidopropyl) dimethylammonio]-1-propanesulfonate), cocamidopropyl hydroxysultaine, ocamidopropyl betaine, phospholipids, and sphingomyelins.

Nonionic surfactants have a polar group that does not have a charge. These include long chain alcohols that exhibit surfactant properties, such as cetyl alcohol, stearyl alcohol, cetostearyl alcohol, oleyl alcohol, and other fatty alcohols. Other long chain alcohols with surfactant properties include polyethylene glycols of various molecular weights, polyethylene glycol alkyl ethers having the formula $CH_3$—$(CH_2)_{10-16}$—$(O$—$C_2H_4)_{1-25}$—$OH$, such as octaethylene glycol monododecyl ether and pentaethylene glycol monododecyl ether; polypropylene glycol alkyl ethers having the formula: $CH_3$—$(CH_2)_{10-16}$—$(O$—$C_3H_6)_{1-25}$—$OH$; glucoside alkyl ethers having the formula $CH_3$—$(CH_2)_{10-16}$—$(O$-glucoside$)_{1-3}$-$OH$, such as decyl glucoside, lauryl glucoside, octyl glucoside; polyethylene glycol octylphenyl ethers having the formula $C_8H_{17}$—$(C_6H_4)$—$(O$—$C_2H_4)_{1-25}$—$OH$, such as Triton X-100; polyethylene glycol alkylphenyl ethers having the formula $C_{19}H_{19}$—$(C_6H_4)$—$(O$—$C_2H_4)_{1-25}$—$OH$, such as nonoxynol-9; glycerol alkyl esters such as glyceryl laurate; polyoxyethylene glycol sorbitan alkyl esters such as polysorbate, sorbitan alkyl esters, cocamide MEA, cocamide DEA, dodecyldimethylamine oxide, block copolymers of polyethylene glycol and polypropylene glycol, such as poloxamers, and polyethoxylated tallow amine (POEA).

A dendritic surfactant molecule may include at least two lipophilic chains that have been joined at a hydrophilic center and have a branch-like appearance. In each dendritic surfactant, there may be from about 2 lipophilic moieties independently to about 4 lipophilic moieties attached to each hydrophilic group, or up to about 8 lipophilic moieties attached to the hydrophilic group for example. "Independently" as used herein with respect to ranges means that any lower threshold may be combined with any upper threshold. The dendritic surfactant may have better repulsion effect as a stabilizer at an interface and/or better interaction with a polar oil, as compared with other surfactants. Dendritic surfactant molecules are sometimes called "hyperbranched" molecules.

A dendritic extended surfactant is a dendritic surfactant having a non-ionic spacer arm between the hydrophilic group and a lipophilic tail. For example, the non-ionic spacer-arm extension may be the result of polypropoxylation, polyethoxylation, or a combination of the two with the polypropylene oxide next to the tail and polyethylene oxide next to the head. The spacer arm of a dendritic extended surfactant may contain from about 1 independently to about 20 propoxy moieties and/or from about 0 independently to about 20 ethoxy moieties. Alternatively, the spacer arm may contain from about 2 independently up to about 16 propoxy moieties and/or from about 2 independently up to about 8 ethoxy moieties. "Independently" as used herein with respect to ranges means that any lower threshold may be combined with any upper threshold. The spacer arm extensions may also be formed from other moieties including, but not necessarily limited to, glyceryl, butoxy, glucoside, isosorbide, xylitols, and the like. For example, the spacer arm of a dendritic extended surfactant may contain both propoxy and ethoxy moieties. The polypropoxy portion of the spacer arm may be considered lipophilic; however, the spacer arm may also contain a hydrophilic portion to attach the hydrophilic group. The hydrophilic group may generally be a polyethoxy portion having about two or more ethoxy groups. These portions are generally in blocks, rather than being randomly mixed. Further, the spacer arm extension may be a poly-propylene oxide chain.

Another type of surfactant is a viscoelastic surfactant (VES). Conventional surfactant molecules are characterized by having one long hydrocarbon chain per surfactant head-group. In a viscoelastic gelled state these molecules aggregate into worm-like micelles. A viscoelastic gel is a gel that has elastic properties, meaning that the gel at least partially returns to its original form when an applied stress is removed. Typical viscoelastic surfactants include N-erucyl-N,N-bis(2-hydroxyethyl)-N-methyl ammonium chloride and potassium oleate, solutions of which form gels when mixed with inorganic salts such as potassium chloride and/or with organic salts such as sodium salicylate. Previously described surfactants may also be considered viscoelastic surfactants.

In some embodiments, the de-scaler solution comprises a biocide. The biocide is an additive of the de-scaler solution that may kill microorganisms present in the de-scaler solution. The biocide may include, but are not limited to, phenoxyethanol, ethylhexyl glycerine, benzyl alcohol, methyl chloroisothiazolinone, methyl isothiazolinone, methyl paraben, ethyl paraben, propylene glycol, bronopol, benzoic acid, imidazolinidyl urea, 2,2-dibromo-3-nitrilopropionamide, and 2-bromo-2-nitro-1,3-propanedial.

In some embodiments, the de-scaler solution comprises a corrosion inhibitor. A corrosion inhibitor is a substance added to or used in combination with a substance which contacts metal surfaces such as a descaler or filter cake removal solution for the purpose of preventing or lessening the rate of corrosion of the metal surface exposed to the substance. The use of corrosion inhibitors is necessary to protect wellbores, pipes, and other metal-containing surfaces from corrosion damage caused by a descaler solution or method. Examples of corrosion inhibitors include benzoin, benzoin-(4-phenylthiosemicarbazone), benzyl-(4-phenylthiosemicarbazone), α-pyridoin, 2,2'-pyridil, salts of N-1-n-hexyl-phthalamate, salts of N-1-n-decyl-phthalamate, salts of N-1-n-tetradecyl-phthalamate, benzimidazole, 2-methylbenzimidazole, 2-aminobenzimidazole, 2-aminoethylbenzimidazole, 2-(2-pyridyl)benzimidazole, 2-hydroxybenzimidazole, 2-mercaptobenzimidazole, 1-benzylbenzimidazole, 1,2-dibenzylbenzimidazole, indole, 1H-benzotriazole, 1,2-benzothiazole, benzaldehyde, 4-amino-5-mercapto-1,2,4-triazole, 3-phenyl-4-amino-5-mercapto-1,2,4-triazole, 1,12-bis(1,2,4-triazolyl)dodecane, octyl alcohol, propargyl alcohol, piperidine, 2-methylpiperidine, 3-methylpiperidine, 4-methylpiperidine, 4-benzylpiperidine, 3,5-dimethylpiperidine, 2,6-dimethylpiperidine, 2-chloroaniline, 2-fluoroaniline, 2-methoxyaniline, 2-ethoxyaniline, 2-methylanniline, glycine, 2-(bis(2-aminoethyl)amino) acetic acid, cinnamaldehyde, benzalacetone, chalcone, 1,4-bis(2-pyridyl)-5H-pyridazino[4,5-b]indole, 3,5-bis(2-thienyl)-1,3,4-thiadiazole, 2-(undecyldimethyl-ammonio)butanol bromide, 2-(dodecyldimethyl-ammonio) butanol bromide, 2-(tridecyldimethyl-ammonio)butanol bromide, 2-(tetradecyldimethyl-ammonio)butanol bromide, 2-(pentadecyldimethyl-ammonio)butanol bromide, 2-hydroxy-1,4-naphthoquinone, gallic acid, α-D-glucose, tannic acid, 1-(2-pyridylazo)-2-naphthol, leucine, salts of N,N-diallyl-N-benzyl dodecyl ammonium cation, salts of N,N-diallyl-N'-formyl 1,6-hexanediammonium cation, N,N-dimethyl-N-benzyl dodecyl ammonium cation, salts of N,N-diallyl-N-propargyl-(12-N'-formylamino)-1-dodecyl ammonium cation, glutamic acid, methionine sulfoxide, methionine sulfone, creatine, N-phosphonomethylglycine, acetylcysteine, S-benzylcysteine, 2-(4(dimethylamino)benzylamino acetic acid, chlorotyrosine, bromotyrosine, iodotyrosine, dichlorotyrosine, dibromotyrosine, diiodotyrosine, chlorobromotyrosine, chlroroiodotyrosine, and bromoiodotyrosine.

In some embodiments, the corrosion inhibitor is present in an amount of 1 to 3 wt %, preferably 1.25 to 2.75 wt %, preferably 1.5 to 2.5 wt %, preferably 1.25 to 2.25 wt %, preferably 2 wt % based on a total weight of the de-scaler solution.

In some embodiments, the de-scaler solution comprises a corrosion inhibitor intensifier. A corrosion inhibitor intensifier (also called a corrosion inhibitor aid) is a substance which enhances the action of the corrosion inhibitor. This enhancement may come in the form of increasing the temperature at which the corrosion inhibitor is effective, increasing the time during which the corrosion inhibitor is effective, or inhibiting the decomposition of the corrosion inhibitor. Examples of corrosion inhibitor intensifiers include methyl formate, chloride salts of potassium, copper (II), bismuth, antimony (III), antimony (V), tin (II), arsenic (III), chromium (VI), nickel (II), magnesium, and calcium, bromide salts of potassium, copper (II), bismuth, antimony (III), antimony (V), tin (II), arsenic (III), chromium (VI), nickel (II), magnesium, and calcium, iodide salts of potassium, copper (II), bismuth, antimony (III), antimony (V), tin (II), arsenic (III), chromium (VI), nickel (II), magnesium, and calcium, $Sb_2O_3$, $Sb_2O_5$, $K_4Sb_2O_7$, $K_2H_2Sb_2O_7$, $Sb_2S_3$, $K_2Sb_2(C_4O_6H_4)_2$, $Sb[(CH_2OH)_2]_3$, $BiOCl$, $Bi_2O_3$, $BiOI_3$, $BiF_3$, bismuth tartrate, bismuth sub salicylate, and tetrahydro-3,5-dimethyl-2H-1,3,5-thiadiazine-2-thione.

In some embodiments, the corrosion inhibitor intensifier is present in an amount of 1 to 3 wt %, preferably 1.25 to 2.75 wt %, preferably 1.5 to 2.5 wt %, preferably 1.25 to 2.25 wt %, preferably 2 wt % based on a total weight of the de-scaler solution.

In some embodiments, the de-scaler solution comprises an anti-scaling agent. The anti-scaling agent is an additive of the de-scaler solution that inhibit the formation and precipitation of crystallized mineral salts that form scale. Such formation and precipitation can occur during use of the de-scaler or after the use of the de-scaler. In some embodiments, the anti-scaling agent remains disposed on the metal surface after the use of the de-scaler. The anti-scaling agent may form a protective film, coating, or other such structure on the metal surface which may slow, prevent, or otherwise inhibit the formation of scale after use of the de-scaler. The anti-scaling agent may include, but are not limited to, phosphonates, acrylic co/ter-polymers, polyacrylic acid (PAA), phosphino poly carboxylic acid (PPCA), phosphate esters, hexamethylene diamine tetrakis (methylene phosphonic acid), diethylene triamine tetra (methylene phosphonic acid), diethylene triamine penta (methylene phosphonic acid) (DETA phosphonate), bis-hexamethylene triamine pentakis (methylene phosphonic acid) (BHMT phosphonate), 1-hydroxyethylidene 1,1-diphosphonate (HEDP phosphonate), and polymers of sulfonic acid on a polycarboxylic acid backbone. In some embodiments, the anti-scaling agent may further include phosphine, sodium hexametaphosphate, sodium tripolyphosphate and other inorganic polyphosphates, hydroxy ethylidene diphosphonic acid, butane-tricarboxylic acid, phosphonates, itaconic acid, and 3-allyloxy-2-hydroxy-propionic acid.

In some embodiments, the de-scaler solution comprises a chelating agent. The chelating agent may include, but are not limited to, dimercaprol (2,3-dimercapto-1-propanol), diethylenetriaminepentaacetic acid (DTPA), hydroxyethylenediaminetriacetic acid (HEDTA), and ethylenediaminetetraacetic acid (EDTA).

In some embodiments, the de-scaler solution comprises a deflocculant. Deflocculant is an additive of the de-scaler solution that prevents a colloid from coming out of suspension or slurries. In some embodiments, the deflocculant may include, but is not limited to, an anionic polyelectrolyte, for example, acrylates, polyphosphates, lignosulfonates (LS), or tannic acid derivatives, for example, quebracho.

In some embodiments, the de-scaler solution comprises a lubricant. In some embodiments, LUBE 10170B may be used as the lubricant. In some embodiments, the lubricant may include, but is not limited to, polyalpha-olefin (PAO), synthetic esters, polyalkylene glycols (PAG), phosphate esters, alkylated naphthalenes (AN), silicate esters, ionic fluids, and multiply alkylated cyclopentanes (MAC).

Concentration of components of the de-scaler solution may be varied to impart desired characteristics of the de-scaler solution. For instance, the concentration of the hydrogen sulfide scavenger may be adjusted according to the amount of the hydrogen sulfide that may be encountered during a wellbore drilling. The hydrogen sulfide is configured to produce upon contact with the hydrogen sulfide, a dispersion of manganese-containing particles such as manganese sulfide and elemental sulfur.

Figure 1:
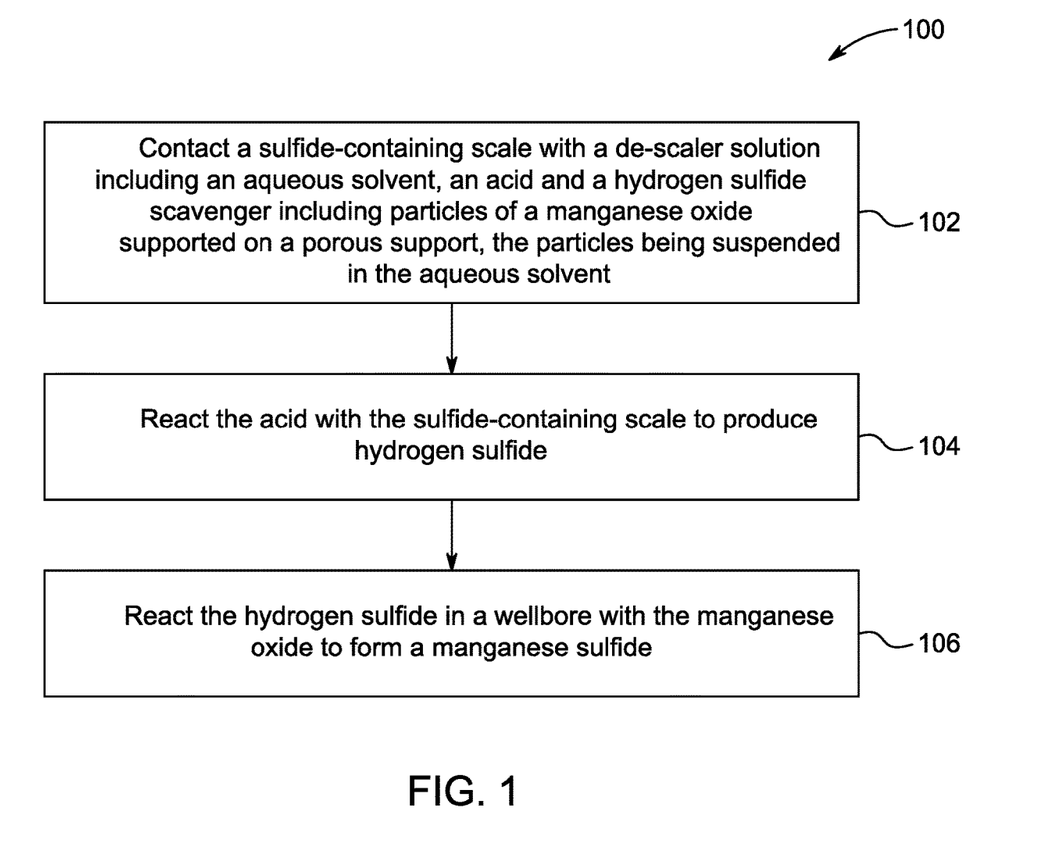
FIG. 1 is a schematic flow chart of a method of removing a sulfide-containing scale from a wellbore, pipe, or other metal-containing surface associated with an oil or gas well, according to certain embodiments.

FIG. 1 illustrates a schematic flow chart of a method 100 of removing the sulfide-containing scale from the wellbore, pipe, or other metal-containing surface associated with the oil or gas well. The order in which the method 100 is described is not intended to be construed as a limitation, and any number of the described method steps can be combined in any order to implement the method 100. Additionally, individual steps may be removed or skipped from the method 100 without departing from the spirit and scope of the present disclosure.

At step 102, the method 100 includes contacting the sulfide-containing scale with the de-scaler solution.

In some embodiments, the hydrogen sulfide scavenger is prepared by an impregnation method. In some embodiments, the hydrogen sulfide scavenger is prepared by an impregnation method followed by calcination. In some embodiments, the hydrogen sulfide scavenger is prepared by a sol-gel method. In some embodiments, the hydrogen sulfide scavenger is prepared by hydrothermal methods.

At step 104, the method 100 includes reacting the acid with the sulfide-containing scale to produce the hydrogen sulfide.

At step 106, the method 100 includes reacting the hydrogen sulfide in the wellbore with the manganese oxide to form the manganese sulfide. In some embodiments, the method 100 may include reacting the hydrogen sulfide in the wellbore with the manganese oxide to form the elemental sulphur. In some embodiments, the hydrogen sulfide scavenger neutralizes 0.025 to 0.125, preferably 0.5 to 0.1, preferably 0.6 to 0.9, preferably 0.7 to 0.8 equivalents of the hydrogen sulfide by weight. In some embodiments, the release of the hydrogen sulfide may even be ceased by the utilized hydrogen sulfide scavenger.

In some embodiments, the wellbore is in a subterranean geological formation. In the present disclosure, the wellbore is a portion of an oil well or a gas well, i.e. a borehole, that faces a formation matrix of the subterranean geological formation. In some embodiments, the wellbore includes casing that is made up of one or more metal selected from one or more of stainless steel, aluminum, fiberglass and titanium. In some embodiments, the wellbore may be a horizontal wellbore or a multilateral wellbore. The horizontal wellbore may include one or more sections located parallel to a ground surface. In some embodiments, temperature and pressure inside the wellbore is relatively high.

Scale is a deposit or coating formed on the surface of metal, rock, or other material that is formed by the precipitation of insoluble materials. Scale may cause undesirable or hazardous conditions or adversely affect operating conditions in a wellbore, in a pipe, or on a metal-containing surface of equipment associated with an oil well. Examples of insoluble materials that may be components of scale include calcium carbonate, calcium sulfate, barium carbonate, barium sulfate, strontium carbonate, strontium sulfate, iron oxide, iron sulfide, iron carbonate, iron hydroxide, magnesium hydroxide, magnesium oxide, silicates such as serpentine, acmite, gyrolite, gehlenite, amorphous silica, quartz, cristobalite, and pectolite, barium sulfide, calcium sulfide, strontium sulfide, aluminum oxy-hydroxide, aluminosilicates such as analcite, cancrinite, and noselite, and hydroxyapatite. Scale is typically classified by its component materials.

In some embodiments, the contacting is performed at a pressure of 14 to 400 psi, preferably 50 to 390 psi, preferably 75 to 380 psi, preferably 100 to 370 psi, preferably 150 to 360 psi, preferably 175 to 350 psi, preferably 200 to 340 psi, preferably 225 to 330 psi, preferably 250 to 320 psi, preferably 275 to 310 psi, preferably 300 psi. In some embodiments, the contacting is performed at a temperature of 100 to 150° C., preferably 105 to 145° C., preferably 110 to 140° C., preferably 115 to 135° C., preferably 120 to 130° C., preferably 122.5 to 127.5° C., preferably 125° C. In some embodiments, the contacting is performed for 1 to 48 hours, preferably 4 to 44 hours, preferably 8 to 40 hours, preferably 12 to 36 hours, preferably 14 to 34 hours, preferably 16 to 32 hours, preferably 18 to 30 hours, preferably 19 to 24 hours, preferably 20 hours.

In some embodiments, the de-scaler solution is used in the contacting in an amount of 1 L per every 75 to 95 g, preferably 1 L per every 77.5 to 92.5 g, preferably 1 L per every 79 to 90 g, preferably 1 L per every 79.5 to 87.5 g, preferably 1 L per every 80 to 85 g, preferably 1 L per every 80.5 to 84 g, preferably 1 L per every 81 to 83.5 g of sulfide-containing scale. In some embodiments, greater than 92.5%, preferably greater than 93%, preferably greater than 93.5%, preferably greater than 94%, preferably greater than 94.5%, preferably greater than 95%, preferably greater than 95.5%, preferably greater than 96%, preferably greater than 96.5%, preferably greater than 97%, preferably greater than 97.5%, preferably greater than 98%, preferably greater than 98.5%, preferably greater than 99% of a volume of the sulfide-containing scale is removed by the method.

In some embodiments, the sulfide-containing scale is removed by dissolving. Dissolving a sulfide-containing scale, as described here, means that the sulfide-containing scale may break apart, partially or completely dissolve, disperse, or disintegrate from a surface of a wellbore or other metal-containing surface or from a portion of a sulfide-containing scale. A method to dissolve a sulfide-containing scale may be considered a "treatment," or a method of "treating" or "removing" a sulfide-containing scale from a surface. In some embodiments, the surface is a wall of a wellbore, which may comprise shale, carbonate, sandstone, other minerals, rocks, or geological formations. In other embodiments, the surface may be concrete, a steel casing, a drill bit, an autoclave, a steel coupon, a ceramic filter, glass, or a glass frit. In some embodiments, the dissolving and removing of a sulfide-containing scale as described by the method is a result of the components of the de-scaler solution reacting with different compounds within the sulfide-containing scale, as previously described. In some embodiments, the dissolving and removing may also result from the physical turbulence or flow of fluids against the sulfide-containing scale, or by diffusion of a fluid into a sulfide-containing scale or between a sulfide-containing scale and the surface.

In preferred embodiments, the sulfide-containing scale is present in the wellbore, pipe, or other metal-containing surface as a continuous covering in direct contact with the metal surface, e.g., a coating that is circumferentially present in a pipe.

In practice, the method of removing a sulfide-containing scale from a wellbore can be applied in various ways. For example, the de-scaler solution can be injected into the wellbore to dissolve the sulfide-containing scale within. Alternatively, the de-scaler solution can be injected directly at the site of a sulfide-containing scale. Alternatively, the de-scaler solution can be allowed to circulate in the wellbore for a certain period of time. Alternatively, the de-scaler solution may be left in the wellbore to soak the sulfide-containing scale. Alternatively, the wellbore containing the sulfide-containing scale may be pre-washed by water and/or mutual solvent and/or pretreated with a surfactant before being treated with the de-scaler solution. Alternatively, the de-scaler solution may be flowed through a tube or pipe to dissolve the iron-scale within. In some embodiments, the de-scaler solution may be flowed through a tube or pipe at a flow rate of 0.00001 to 1000 L/min, preferably 0.0001 to 100 L/min, preferably 0.001 to 10 L/min. Alternatively, the de-scaler solution may be left in the tube or pipe to soak the sulfide-containing scale. Alternatively, the de-scaler solution may be circulated through a portion of a tube or pipe in which liquid is able to flow to remove a blockage comprising the sulfide-containing scale from a portion of the tube or pipe in which liquid is not able to flow. In some embodiments, the de-scaler solution is used in a diluted form. In some embodiments, the de-scaler solution is diluted with water. In alternative embodiments, the de-scaler solution is not used in a diluted form.

The method of the present disclosure is applicable in numerous different environments. It can be used to remove sulfide-containing scale produced from drilling, production, completion, workover, or stimulation activity, either produced intentionally or unintentionally. It can be used in screen-only completions or gravel pack completions, an open hole or a cased hole, vertical or highly deviated wells. The de-scaler solution may be used as single-application soak or circulating fluid in which the de-scaler solution also serves as a carrier fluid for, e.g., a gravel pack operation; in conjunction with a gelling agent or viscoelastic surfactant (e.g., ClearFRAC™) or alone, with a variety of clean-up tools and other fluid additives (e.g., anti-corrosive agents) or dissolution components. Since the problem of placement and uniform dissolution are present in virtually every instance, the de-scaler solution and method of the present disclosure are readily applicable to any scenario in which it is desirable to remove a calcium-containing filter cake from a wellbore or near-wellbore region in a formation, regardless of whether the sulfide-containing scale is produced during drilling or during other post-drilling operations (e.g., fluid-loss control pill, gravel pack operation, fracturing, matrix acidizing, and so forth).

Following the contacting, in some embodiments, the method may further comprise a step of flushing away a dispersed sulfide-containing scale with a low concentration of organic or non-organic acid as commonly known in the art to increase permeability.

In some embodiments, while driving a drill bit to form a wellbore in the subterranean geological formation may lead to the production of a formation fluid. In some embodiments, the formation fluid may be a sour gas and a sour crude oil. The sour gas is a natural gas including an amount of the hydrogen sulfide. In some embodiments, the formation fluid may include, but are not limited to, natural gas (i.e., primarily methane), hydrocarbon or non-hydrocarbon gases (including condensable and non-condensable gases), light hydrocarbon liquids, heavy hydrocarbon liquids, rock, oil shale, bitumen, oil sands, tar, coal, and/or water. Further, the non-condensable gases may include, but are not limited to hydrogen, carbon monoxide, carbon dioxide and methane. In some other embodiments, the formation fluid may be in the form of a gaseous fluid, a liquid, or a double-phase fluid. In some embodiments, the formation fluid includes the hydrogen sulfide. Microorganisms such as sulfate reducing bacteria may generate the hydrogen sulfide in gas and oil reservoirs. In some embodiments, some other method used or known in the art may lead to the formation of the hydrogen sulfide in the wellbore.

In some embodiments, the de-scaler solution performs sweetening of sour liquids (for example, sour water). In some embodiments, the de-scaler solution performs sweetening of sour gases (for example, sour fuel gases). The sour gas may be bubbled into the de-scaler solution to get devoid of the hydrogen sulfide gas. The present disclosure also relates to the hydrogen sulfide scavenging during a well stimulation.

EXAMPLES

The following examples describe and demonstrate exemplary embodiments of the method 100 of removing the sulfide-containing scale from the wellbore, pipe, or other metal-containing surface associated with the oil or gas well described herein. The examples are provided solely for the purpose of illustration and are not to be construed as limitations of the present disclosure, as many variations thereof are possible without departing from the spirit and scope of the present disclosure.

Example 1

A catalyst was synthesized using an impregnation method. Loading of manganese precursor (such as Mn$(NO_3)_2 \cdot 4H_2O$) on gamma ($\gamma$) alumina was 0.5 (i.e., a molar ratio of MnOx:$Al_2O_3$ is 1:2) to form a mixture. The mixture was stirred at room temperature (RT) using a magnetic stirrer until a thick paste was formed. The paste was dried at 50 degrees Celsius (° C.) using oven until a dry material is obtained. The dry material was calcined at 400° C. for 4 hours under an air environment in order to oxidize Mn$(NO_3)_2 \cdot 4H_2O$ into MnOx.

Example 2

Dissolution of iron sulfide (obtained from a local oilfield) was carried out using in 100 milliliters (mL) flask. 50 mL of 18.5% hydrochloric acid was placed in the flask. After that, 0.5 grams (g) of the iron sulfide was added to form a mixture. The mixture was stirred continuous using a magnetic stirrer for 24 hours. The acid dissolution of the iron sulfide was carried out at RT and atmospheric pressure. Nitrogen gas was bubbled into the mixture. The gas leaving the flask (nitrogen and the produced hydrogen sulfide) was sent to a hydrogen sulfide gas detector in order to measure the amount of the hydrogen sulfide released.

Example 3

The same procedure as in example 2, however, in the presence of 0.1 g of the hydrogen scavenger (MnOx/$Al_2O_3$).

Figure 2:
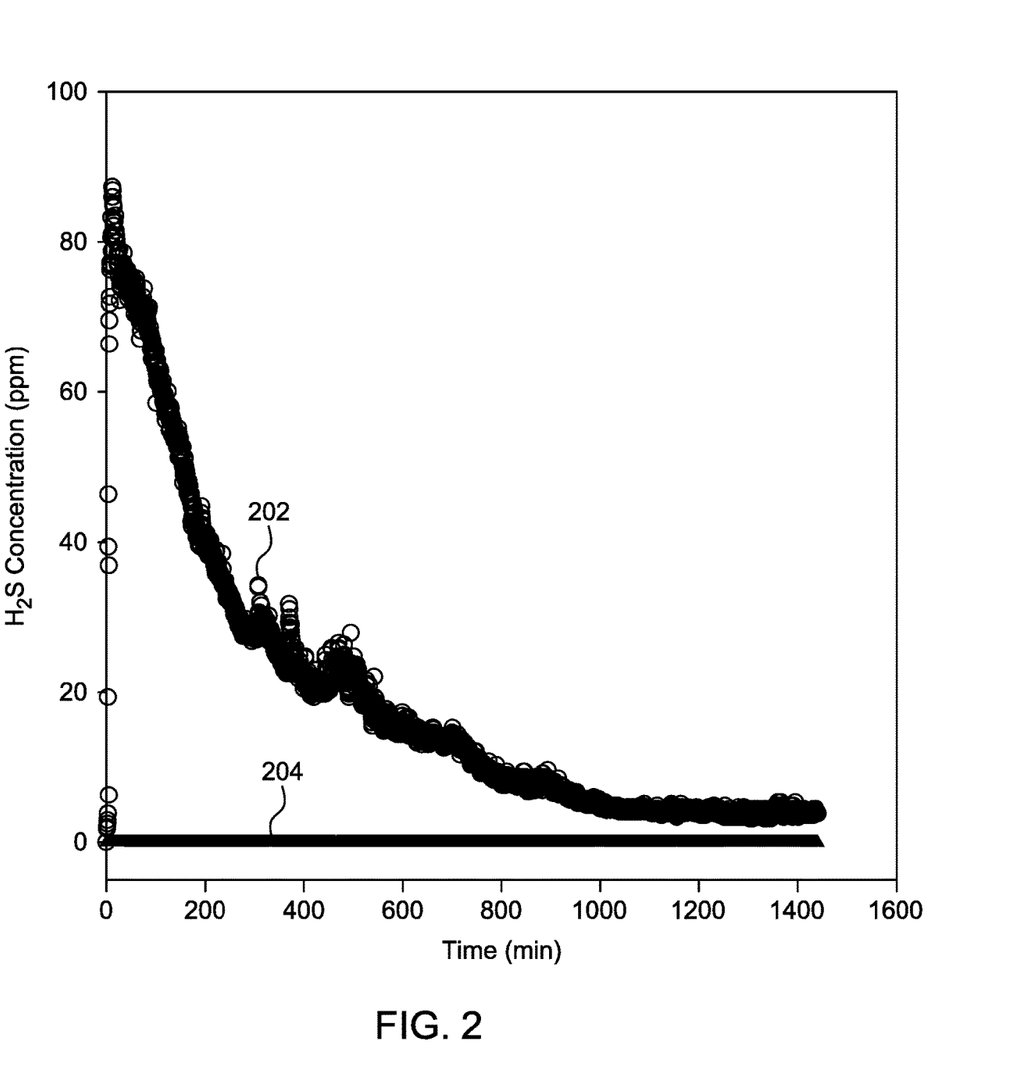
FIG. 2 is a graph depicting an effect of a hydrogen sulfide scavenger on evolution of hydrogen sulfide, according to certain embodiments.

FIG. 2 refers to a graph depicting concentration of the hydrogen sulfide released during the sulfide-containing scale removal process in the absence (based on example 2) and presence (based on example 3) of the hydrogen sulfide scavenger. The graph shows a first trend line 202 and a second trend line 204 corresponding to the concentration of the hydrogen sulfide release during the sulfide-containing scale removal process in the absence and presence of the hydrogen sulfide scavenger, respectively. The graph shows that the evolution of the hydrogen sulfide during the sulfide-containing scale removal process in the presence of the hydrogen sulfide scavenger is zero.

Example 4

Conversion of the hydrogen sulfide into the manganese sulfide and the elemental sulphur (depending on the pH of the de-scaler solution) by the hydrogen sulfide scavenger are shown by equation (1) and equation (2).

$$MnO_2 + 2H_2S \rightarrow MnS + S + 2H_2O \tag{1}$$

$$MnO + H_2S \rightarrow MnS + H_2O \tag{2}$$

Hence, the present invention represents that the hydrogen sulfide scavenging occurs during a metal sulfide scale removal. Capturing and converting the hydrogen sulfide into the elemental sulfur or sulfates during the metal sulfide scale removal prevents the release of the hydrogen sulfide into a well surface. In some embodiments, the manganese sulfide produced in-situ acts as the viscosifier or the weighting agent.

The present disclosure provides the method which scavenges the hydrogen sulfide gas during the acid dissolution of acid-soluble sulfides using non-hazardous, effective, regenerable and cheap hydrogen sulfide scavenger. Presence of a small concentration (0.2 wt. %) of the manganese oxide(s) impregnated on the alumina (MnO$_x$/$Al_2O_3$) in the aqueous solution of the hydrochloric acid reacts with the hydrogen sulfide and totally removes the hydrogen sulfide. The present disclosure also provides sweetening of the sour gases and liquids.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method of removing a sulfide-containing scale from a wellbore, pipe, or other metal-containing surface associated with an oil or gas well, the method comprising:
contacting the sulfide-containing scale with a de-scaler solution, said de-scaler solution consisting of:
water;
hydrochloric acid; and
particles of a manganese oxide supported on a porous alumina support, the particles being suspended in the water;
reacting the hydrochloric acid with the sulfide-containing scale to produce hydrogen sulfide; and
reacting the hydrogen sulfide in the wellbore with the manganese oxide to form manganese sulfide; and
bubbling nitrogen gas into the descaler solution; wherein
the particles of a manganese oxide supported on the porous alumina support have a mean particle size of 100 to 10,000 nanometers; and
the particles of manganese oxide supported on a porous alumina support have a molar ratio of manganese to aluminum of 1:1 to 1:5.

2. The method of claim 1, wherein the particles of the manganese oxide have a mean particle size of 5 to 150 nm and are on at least one selected from an exterior surface of the porous alumina support and within pores of the porous alumina support.

3. The method of claim 1, wherein
the particles of the manganese oxide supported on the porous alumina support are present in the de-scaler solution in an amount of 0.01 to 5 weight percent (wt. %), based on a total weight of the de-scaler solution.

4. The method of claim 1, wherein
the particles of the manganese oxide supported on the porous alumina support neutralizes 0.025 to 0.125 equivalents of the hydrogen sulfide by weight.

5. The method of claim 1, wherein the contacting includes continuously stirring the descaler solution to suspend the particles of the manganese oxide supported on the porous alumina support in the water.

6. The method of claim 1, wherein the sulfide-containing scale is contacted with the descaler composition for a period of 24 hours.

* * * * *